US012651463B2

(12) United States Patent
Pillai

(10) Patent No.: US 12,651,463 B2
(45) Date of Patent: Jun. 9, 2026

(54) SYSTEMS AND METHODS FOR IDENTIFYING LIFEFORMS AROUND A STATIONARY VEHICLE

(71) Applicant: Toyota Connected North America, Inc., Plano, TX (US)

(72) Inventor: Preeti J. Pillai, Allen, TX (US)

(73) Assignee: Toyota Connected North America, Inc., Plano, TX (US)

( * ) Notice: Subject to any disclaimer, the term of this patent is extended or adjusted under 35 U.S.C. 154(b) by 177 days.

(21) Appl. No.: 18/591,381

(22) Filed: Feb. 29, 2024

(65) Prior Publication Data

US 2025/0278942 A1 Sep. 4, 2025

(51) Int. Cl.
*G06V 20/58* (2022.01)
*G06V 10/764* (2022.01)
*G06V 40/10* (2022.01)

(52) U.S. Cl.
CPC ............ *G06V 20/58* (2022.01); *G06V 10/764* (2022.01); *G06V 40/10* (2022.01)

(58) Field of Classification Search
CPC ....... G06V 20/58; G06V 40/10; G06V 10/764
USPC ......................................................... 701/519
See application file for complete search history.

(56) References Cited

U.S. PATENT DOCUMENTS

| | | |
|---|---|---|
| 7,049,945 B2 | 5/2006 | Breed et al. |
| 7,170,401 B1 | 1/2007 | Cole |
| 7,209,221 B2 | 4/2007 | Breed et al. |

| | | |
|---|---|---|
| 8,570,188 B2 | 10/2013 | Yamashita |
| 8,854,197 B2 | 10/2014 | Ikeda et al. |
| 9,604,573 B2 | 3/2017 | Shimizu et al. |
| 9,892,606 B2 * | 2/2018 | Venetianer ....... G08B 13/19652 |
| 10,152,649 B2 | 12/2018 | Shambik et al. |
| 10,427,604 B2 | 10/2019 | Schofield et al. |
| 10,496,890 B2 | 12/2019 | Boss et al. |
| 10,665,104 B2 | 5/2020 | Sivashankar et al. |
| 11,511,666 B2 | 11/2022 | Javeri et al. |
| 11,610,408 B2 | 3/2023 | Yoshida |
| 11,740,358 B2 | 8/2023 | Yangel et al. |
| 11,827,148 B2 | 11/2023 | Oigawa |

(Continued)

FOREIGN PATENT DOCUMENTS

| | | | |
|---|---|---|---|
| DE | 102022110545 A1 * | 11/2023 | ............. G06V 40/10 |
| EP | 4049877 A1 | 8/2022 | |
| WO | WO-2024034241 A1 * | 2/2024 | ........... B60R 25/102 |

OTHER PUBLICATIONS

Machine translation of DE-102022110545-A1 (Year: 2023).*

(Continued)

*Primary Examiner* — Kenneth M Dunne
(74) *Attorney, Agent, or Firm* — Christopher G. Darrow; Darrow Mustafa PC

(57) ABSTRACT

Systems, methods, and other embodiments described herein relate to notifying vehicle operators of lifeforms in the vicinity of a stationary vehicle. In one embodiment, a method includes identifying, from sensor data collected from a sensor of a stationary vehicle, a lifeform in a vicinity of the stationary vehicle. The method also includes tracking a movement of the lifeform in the vicinity of the stationary vehicle determining, from the sensor data, a last time the lifeform was in a field of view of the sensor. The method also includes presenting a notification identifying the lifeform and the last time the lifeform was in the field of view of the sensor.

20 Claims, 9 Drawing Sheets

754

(56)         References Cited

U.S. PATENT DOCUMENTS

| | | | | |
|---|---|---|---|---|
| 2014/0309919 | A1 | 10/2014 | Ricci | |
| 2015/0307024 | A1* | 10/2015 | Fukuda | B60Q 9/008 |
| | | | | 382/103 |
| 2015/0348417 | A1 | 12/2015 | Ignaczak et al. | |
| 2019/0294894 | A1* | 9/2019 | Fox | G08B 13/19647 |
| 2020/0285953 | A1* | 9/2020 | Samples | G06F 9/542 |
| 2020/0298758 | A1* | 9/2020 | Ardalkar | B60R 1/23 |
| 2021/0409379 | A1* | 12/2021 | Hwang | G08G 1/0112 |
| 2022/0009514 | A1* | 1/2022 | Miyata | B60R 25/305 |
| 2022/0176911 | A1 | 6/2022 | Nayak et al. | |
| 2022/0284816 | A1 | 9/2022 | Ho et al. | |
| 2023/0005374 | A1 | 1/2023 | Elimaleh et al. | |
| 2023/0219527 | A1 | 7/2023 | Amadi et al. | |
| 2024/0294117 | A1* | 9/2024 | Akimoto | B60R 11/04 |
| 2024/0404296 | A1* | 12/2024 | Sah | G06V 20/58 |
| 2025/0061323 | A1* | 2/2025 | Nath | G06N 3/0895 |

OTHER PUBLICATIONS

Machine translation of DE-102022110545-A1 spec with paragraph numbers (Year: 2023).*
Machine translation of WO-2024034241-A1 (Year: 2024).*
Ford Authority. "Ford Files Another Patent for Pet Detection System", Retrieved from the Internet: <https://fordauthority.com/2023/07/ford-files-another-patent-for-pet-detection-system/>, retrieved Jan. 16, 2024. (1 page).
Child Check-Mate Systems. "Child Passenger Safety Alarm Systems", Retrieved from the Internet: <https://childcheckmate.com/ #:%7E:text=The%20%E2%80%9CChild%20Check%2DMate%20System,upon%20completion%20of%20each%20run>, retrieved Jan. 16, 2024. (3 pages).
DeepLabCut. "DeepLabCut—The Mathis Lab of Adaptive Intelligence", Retrieved from the Internet: <https://www.mackenziemathislab.org/deeplabcut>, retrieved Jan. 16, 2024. (4 pages).
Openpifpaf Guide. "Introduction—OpenPifPaf Guide", Retrieved from the Internet: <https://openpifpaf.github.io/intro.html>, retrieved Jan. 16, 2024. (4 pages).
Van Beeck, Kristof. "The automatic blind spot camera: hard real-time detection of moving objects from a moving camera." Sep. 2016.
Zamri, Nurul Nadira Binti Mohd. "Blind-Spot Alert System." (2023).
Geronimo et al. "Survey of Pedestrian Detection for Advanced Driver Assistance Systems", IEEE transactions on pattern analysis and machine intelligence. vol. 32 Issue 7. Jul. 2010.
Gupta et al. "Deep learning for object detection and scene perception in self-driving cars: Survey, challenges, and open issues", Array, vol. 10. 2021.
Lujic et al. "Increasing Traffic Safety with Real-Time Edge Analytics and 5G", Proceedings of the 4th International Workshop on Edge Systems, Analytics and Networking. 2021.
Van Beeck et al. "The automatic blind spot camera: a vision-based active alarm system", Computer Vision-ECCV 2016 Workshops. 2016.
Extended European Search Report for European application No. 25160256.1, mailed May 21, 2025. (47 pages).

* cited by examiner

754

Tue
12:50pm

Animal sighted near
front left wheel

Sat
20:00pm

Kids spotted near
vehicle trunk

756

Camera Images

Motion Detection

Vehicle
100

Camera Images

Human/Animal
Classification

Lifeform Class

Pose Detection

Pose

Distance Calibration

Lifeform
Distance

Location Estimation

Lifeform
Information

Remote
Device
858

Notification

754

SYSTEMS AND METHODS FOR IDENTIFYING LIFEFORMS AROUND A STATIONARY VEHICLE

TECHNICAL FIELD

The subject matter described herein relates, in general, to tracking the movement of objects around a stationary vehicle and, more particularly, to notifying a user of lifeforms that are in the vicinity of the stationary vehicle, even when the lifeforms may presently be outside of a field of view of sensors of the stationary vehicle.

BACKGROUND

Vehicles may be equipped with sensors that facilitate perceiving other vehicles, obstacles, pedestrians, and additional aspects of a surrounding environment. For example, a vehicle may have a light detection and ranging (LiDAR) sensor that uses light to scan the surrounding environment. At the same time, logic associated with the LiDAR analyzes acquired data to detect the presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment.

However, in some examples, the sensor system may have a limited field of view. As such, some objects may go undetected or be located around the vehicle outside the field of view of the sensor system. In general, as further awareness is developed by the vehicle about the surrounding environment, the vehicle operation and safety system operation is enhanced.

SUMMARY

In one embodiment, example systems and methods relate to a manner of improving the identification of lifeforms, such as children and animals, that are in the vicinity of a stationary vehicle and notifying an owner of the stationary vehicle when a lifeform was last seen in the vicinity of the stationary vehicle such that the owner may take any appropriate safety measure when operating the vehicle.

In one embodiment, a lifeform notification system for identifying lifeforms in the vicinity of a stationary vehicle and generating a notification of the lifeform and the last time the lifeform was detected in the vicinity of the stationary vehicle is disclosed. The lifeform notification system includes one or more processors and a memory communicably coupled to the one or more processors. The memory stores instructions that, when executed by the one or more processors, cause the one or more processors to identify, from sensor data collected from a sensor of a stationary vehicle, a lifeform in a vicinity of the stationary vehicle. The memory also stores instructions that, when executed by the one or more processors, cause the one or more processors to track a movement of the lifeform in the vicinity of the stationary vehicle and determine, from the sensor data, a last time the lifeform was in a field of view of the sensor. The memory also stores instructions that, when executed by the one or more processors, cause the one or more processors to present a notification identifying the lifeform and the last time the lifeform was in the field of view of the sensor.

In one embodiment, a non-transitory computer-readable medium for identifying and generating notifications of lifeforms in the vicinity of a stationary vehicle and including instructions that, when executed by one or more processors, cause the one or more processors to perform one or more functions is disclosed. The instructions include instructions to identify, from sensor data collected from a sensor of a stationary vehicle, a lifeform in the vicinity of the stationary vehicle. The instructions also include instructions to track the movement of the lifeform in the vicinity of the stationary vehicle and determine, from the sensor data, the last time the lifeform was in the field of view of the sensor. The instructions also include instructions to present a notification identifying the lifeform and the last time the lifeform was in the field of view of the sensor.

In one embodiment, a method for identifying and generating notifications of lifeforms in the vicinity of a stationary vehicle is disclosed. In one embodiment, the method includes identifying, from sensor data collected from a sensor of a stationary vehicle, a lifeform in the vicinity of the stationary vehicle. The method also includes tracking the movement of the lifeform in the vicinity of the stationary vehicle and determining, from the sensor data, the last time the lifeform was in the field of view of the sensor. The method also includes presenting a notification identifying the lifeform and the last time the lifeform was in the field of view of the sensor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
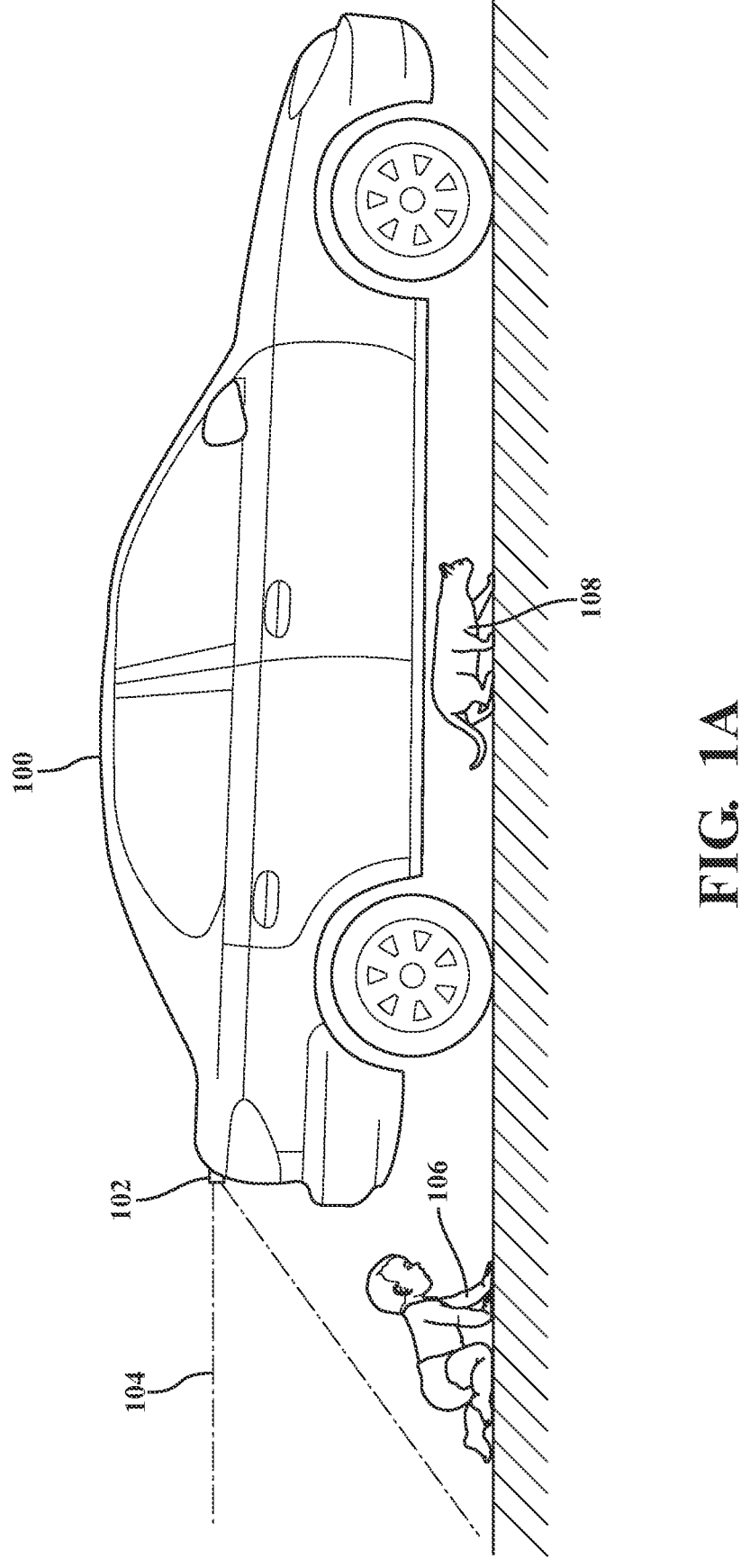
FIGS. 1A and 1B illustrate an environment where certain lifeforms may be undetected by environment sensors of a stationary vehicle.

Systems, methods, and other embodiments associated with improving the detection of certain classes of lifeforms, such as children and animals, that may regularly be undetected by a sensor system of a vehicle and presenting notifications of these detected lifeforms to ensure their safety when an operator is about to operate a vehicle are disclosed herein. Vehicles are becoming commonplace in many places of the world. Yet, their presence carries an inherent risk due to the relative size and power of the vehicle to nearby humans and animals. For example, vehicles may be parked in public, multi-family, and personal garages where adults, children, and animals may wander. Even when not in garages, it is common for humans and animals to be in the vicinity of vehicles. For example, people walk past parked vehicles, children may play around vehicles that are parked in a driveway or may linger around an adjacent vehicle in a parking lot. While an adult may appreciate the danger vehicles pose and may exercise appropriate precautions to ensure their safety, children and animals may not fully appreciate these situations and may not exercise appropriate caution around vehicles.

While vehicles may be equipped with sensors, such as cameras, that provide a vehicle operator with a view around the vehicle, some lifeforms, such as children and animals, may be in an area around the vehicle that is outside the field of view of the sensor system. Due to their larger stature, adults are more likely to be detected by vehicle sensors than smaller children and animals who may fall outside of the field of view of the vehicle, even when in the vicinity of the vehicle. For example, a backup camera of a vehicle may show a view behind the vehicle from about three feet up. As such, a small child and/or an animal may be behind the vehicle but outside of the field of view of the camera. As another example, an animal may seek shelter from inclement weather near a warm engine under a vehicle. In either example, the vehicle operator may be unaware of the child and/or animal and may thus not take any particular safety measure.

Even when a child or animal is within the field of view of the vehicle sensor system, a vehicle operator may spend just a few seconds checking the feeds from these sensors to identify whether or not the vehicle path is clear. For example, a side-view camera may be tilted downwards, giving clear visibility into specific zones beside the trunk and rear door of a vehicle. However, a vehicle operator may just quickly glance at the side-view mirrors before reversing. Obviously, an undesirable situation may arise when the child/animal, who may not be aware that a vehicle is about to reverse and/or unaccustomed with how to respond to a reversing vehicle, is not seen by the driver and is undetected by rear-view or side-view cameras that may not capture a child bent over, playing near the vehicle.

Accordingly, the lifeform notification system of the present specification warns a vehicle operator of a detected child or animal near a stationary vehicle. That is, the present lifeform notification system identifies and notifies an individual, such as a vehicle operator, of unattended and dynamic lifeforms near a vehicle. The system relies on the sensors (e.g., side-view cameras, backup cameras, etc.) that provide clear visibility into specific zones beside the trunk and rear door of the vehicle, which may constitute blind spots to the vehicle operator, to capture moving objects that are low to the ground such as children and pets. The system detects dynamic and static objects that are alive and close to the ground (e.g., children, animals, etc.). These objects may be beyond the field of view of the sensor system and, therefore, may be undetected by a vehicle operator. In particular, the lifeform notification system may use machine-learning models to detect low-to-the-ground objects using data from cameras or other sensors oriented toward the ground (e.g., side-view cameras for blind spot detection). Given that the children or pet may not be in the field of view of the sensor system when the operator enters the vehicle, the system may identify when the child or pet was last in the field of view of the sensor system. The system generates a notification as a safety warning to a vehicle operator, which safety warning indicates when sensors of the vehicle last detected the child/pet.

Accordingly, the system may detect motion activity from a camera using a supervised or unsupervised machine-learning model. If the motion activity exceeds a certain duration and the object is greater than a threshold size (to distinguish lifeform movement from non-lifeform movements such as light glare, dust particles, falling leaves, etc.), the lifeform notification system activates a classification model that classifies the object as an adult, child, or animal.

To classify a moving lifeform, the lifeform notification system may implement dynamic object localization and a machine-learning model to differentiate different lifeforms (e.g., taller humans, shorter humans, animals, birds, etc.). In a specific example, the lifeform notification system may perform pose detection, in an example using a machine learning model, to determine the pose of the lifeform as the pose of the lifeform may indicate whether or not the lifeform is passing by the vehicle or likely still in the vicinity of the vehicle. As an example, the lifeform notification system may estimate the lifeform height and location from a camera viewpoint and approximate the corresponding object location near the vehicle. From these parameters, the lifeform notification system can determine if the lifeform is the height of an adult, a toddler, a child, or a short animal. All of this information, e.g., classification, location, pose, etc., may aid in the classification of a lifeform as an adult, child, toddler, or animal.

In general, regarding notifications, the lifeform notification system may identify a child and/or animal near a stationary vehicle and generate a safety alert to notify an operator that a child or animal is near the vehicle. Specifically, the lifeform notification system may generate a warning that indicates the last time the child or animal was seen in the vicinity of the vehicle so that an operator may take appropriate remedial action. For example, a notification may indicate that a child was seen playing behind a vehicle parked in a private garage at 12:30 pm. In this example, an operator entering the vehicle at 12:35 pm may receive the notification on their mobile device and take an appropriate remedial measure, such as checking behind and around the vehicle to ensure the child is clear from the vehicle before operation. As such, the lifeform notification system detects these smaller objects and triggers a notification to a vehicle operator, including information on the detected object, such as whether it is a child or animal, an area where the object is detected, and a time stamp indicating when the object was last seen. Accordingly, the operator may check the vehicle's vicinity before safely backing out of the parked spot.

In an example, the lifeform notification system may estimate a location of the lifeform that has left the field of view of the camera. For example, it may be that an animal is detected as moving across the field of view of a side-view camera. Based on pose information for the animal, the direction of travel of the animal, and a lack of detection of the animal by another camera, the lifeform notification system may infer that the animal has taken residence underneath the vehicle. In this example, in addition to indicating the last time the animal was seen, the notification may indicate that the animal may be under the vehicle, an area that a driver may not usually check before vehicle operation.

As such, the present lifeform generation system provides views of the surroundings of a vehicle that may be undetectable by a vehicle operator/vehicle sensor system or that may cursorily be checked before the operation of the vehicle. Moreover, the notification provides timestamps of when lifeforms are viewed so that an operator may determine whether it is likely that the lifeform is still in the area. Furthermore, by estimating the location of an object, the lifeform notification system not only identifies currently observed lifeforms but also provides a notification of lifeforms that may still be in a danger zone of the vehicle, notwithstanding the lifeform not currently being detected by a vehicle sensor system.

As described above, in one example, all this may be done while the vehicle is in a standby or off state. That is, backup and side-view cameras may be actively capturing data just when the vehicle is turned on. As such, these cameras may not detect objects, such as children or animals, around the vehicle when the vehicle is off. The cameras relied on by the present system may be battery-powered, capturing and processing the images to detect lifeforms even when the vehicle is off. As such, the lifeform notification system provides continuous offline monitoring of the surroundings of the vehicle, whereas vehicles may otherwise be unmonitored when offline. That is to say, the lifeform notification system of the present specification may provide notifications of potential obstructions of a vehicle's path that previously were not generated because of a vehicle not being monitored while in an off state.

Figure 1B:
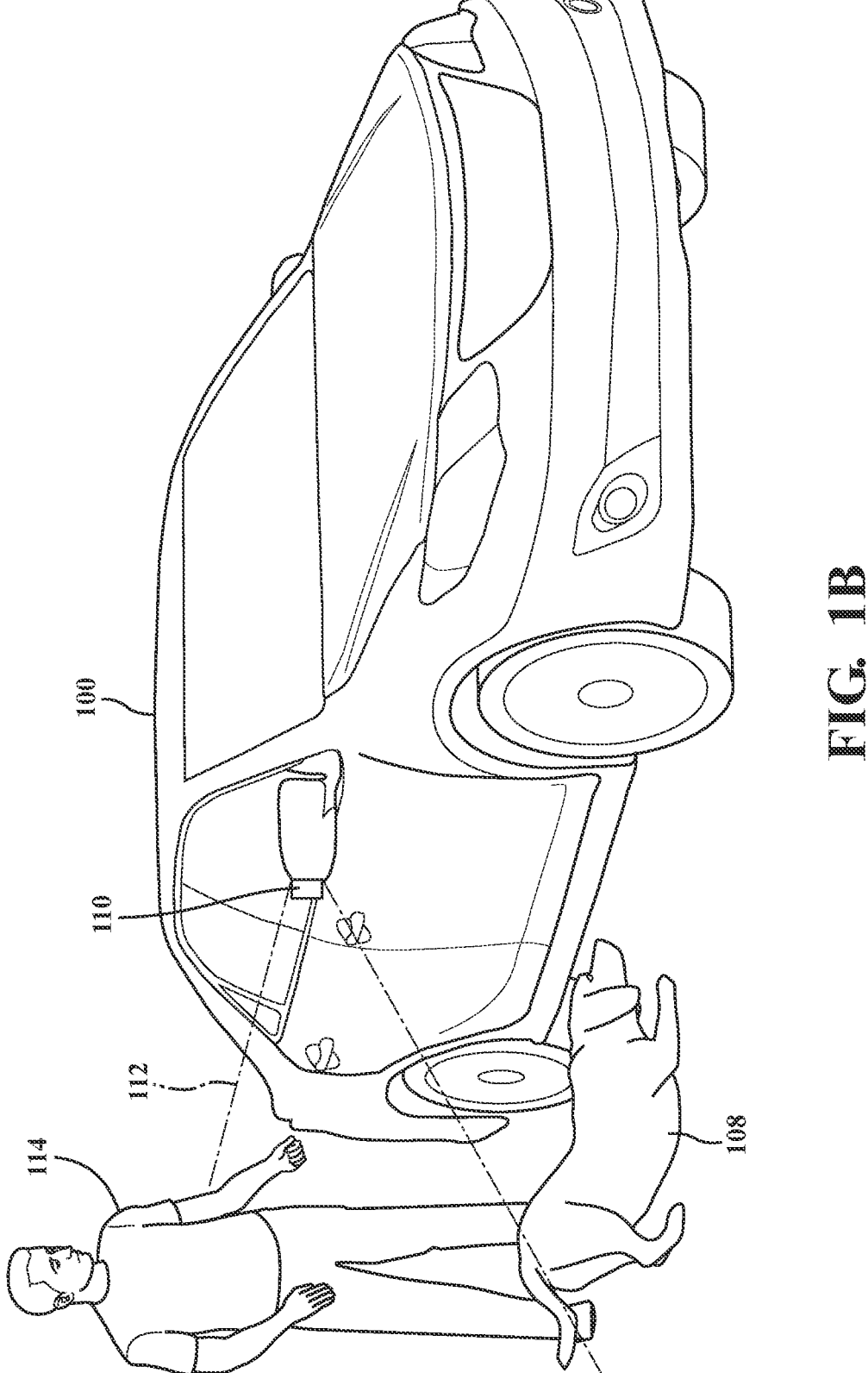

Turning now to the figures, FIGS. 1A and 1B illustrate an environment where certain lifeforms may be undetected by environment sensors of a stationary vehicle 100. As described above, a stationary vehicle 100 may be equipped with various environment sensors such as cameras, LiDAR sensors, radar sensors, and others that detect objects in the surrounding environment of the stationary vehicle 100. As a specific example, a vehicle 100 may be equipped with a backup camera 102 and a side-view camera 110. While the backup camera 102 undoubtedly provides value in its ability to notify a vehicle operator of objects around portions of the vehicle 100 that may be difficult or impossible to view while the driver is operating the vehicle 100, some objects may still be undetected by these sensors due to limited fields of view. For example, a small child 106 may fall below the field of view 104 of the backup camera 102, even though the backup camera 102 may generally be pointed towards the ground. Moreover, while a side-view camera 110 may detect an average height adult 114, an animal 108 such as a dog may fall outside of the field of view 112 of the side-view camera 110, again notwithstanding the side-view camera 110 being pointed generally toward the ground. As another example, an animal 108 underneath the vehicle, as depicted in FIG. 1A may not be detectable by any of the environment sensors of the vehicle 100. These undetected lifeforms may still be in a dangerous position relative to the vehicle 100.

While these objects may not be detected by the cameras when a vehicle operator is observing the sensor feed (e.g., viewing a feed of a backup camera 102 and/or side-view camera 110), at some point in the past, these sensors may have detected the objects that are currently outside of the fields of view 104 and 112 of the respective cameras 102 and 110. As such, the present lifeform notification system presents notifications that a lifeform that may not currently be in the field of view of the driver has been previously detected, such that a vehicle operator may be made aware that even though not presently detected, certain lifeforms may still be in the vicinity of the vehicle. That is, the lifeform notification system presents an alert that a lifeform was recently detected in the vicinity of the vehicle 100, even when the sensor system does not currently detect the lifeform.

While FIGS. 1A and 1B specifically depict a backup camera 102 and a side-view camera 110, the vehicle 100 may be equipped with different types of cameras (e.g., front-facing cameras) and different types of sensors (e.g., LiDAR and radar sensors) that may detect lifeforms and transmit information to the lifeform notification system for lifeform identification and tracking.

Figure 2:
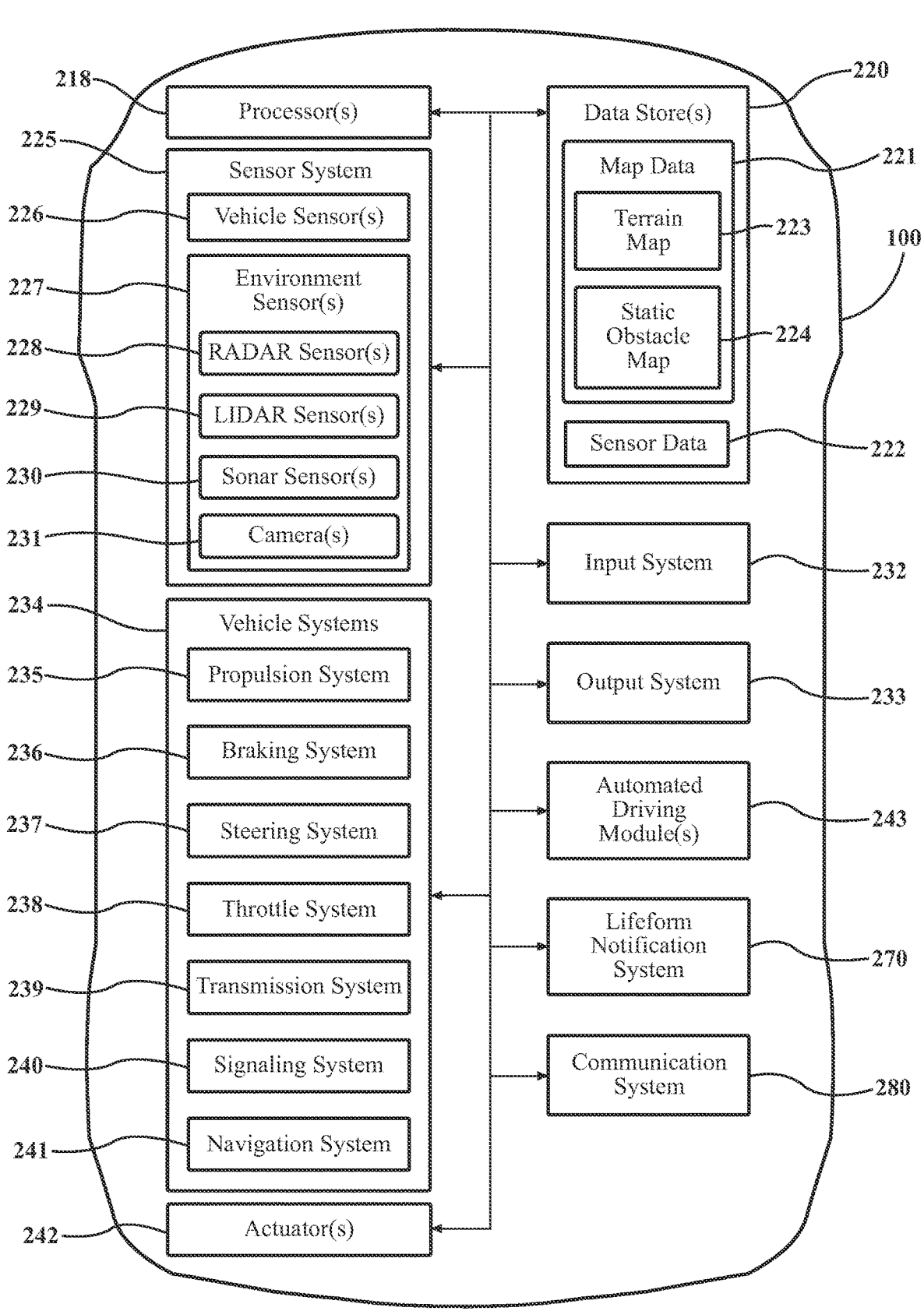
FIG. 2 illustrates one embodiment of a vehicle within which systems and methods disclosed herein may be implemented.

Referring to FIG. 2, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with notifying an operator of objects in the vicinity of the vehicle 100 that may presently be undetected by the environment sensors 227.

The vehicle 100 also includes various elements. It will be understood that in various embodiments it may not be necessary for the vehicle 100 to have all of the elements shown in FIG. 2. The vehicle 100 can have different combinations of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 2 and will be described along with subsequent figures. However, a description of many of the elements in FIG. 2 will be provided after the discussion of FIGS. 3-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a lifeform notification system 270 that is implemented to perform methods and other functions as disclosed herein relating to improving vehicle 100 detection of lifeforms in the vicinity of the vehicle 100.

As will be discussed in greater detail subsequently, the lifeform notification system 270, in various embodiments, is implemented partially within the vehicle 100, and as a cloud-based service. For example, in one approach, functionality associated with at least one module of the lifeform notification system 270 is implemented within the vehicle 100 while further functionality is implemented within a cloud-based computing system. Thus, the lifeform notification system 270 may include a local instance at the vehicle 100 and a remote instance that functions within the cloud-based environment.

Moreover, the lifeform notification system 270, as provided for within the vehicle 100, functions in cooperation with a communication system 280. In one embodiment, the communication system 280 communicates according to one or more communication standards. For example, the communication system 280 can include multiple different antennas/transceivers and/or other hardware elements for communicating at different frequencies and according to respective protocols. The communication system 280, in one arrangement, communicates via a communication protocol, such as a WiFi, dedicated short-range communications (DSRC), vehicle-to-infrastructure (V2I), vehicle-to-vehicle (V2V), or another suitable protocol for communicating between the vehicle 100 and other entities in the cloud environment. Moreover, the communication system 280, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the lifeform notification system 270 can leverage various wireless communication technologies to provide communications to other entities, such as members of the cloud-computing environment.

Figure 3:
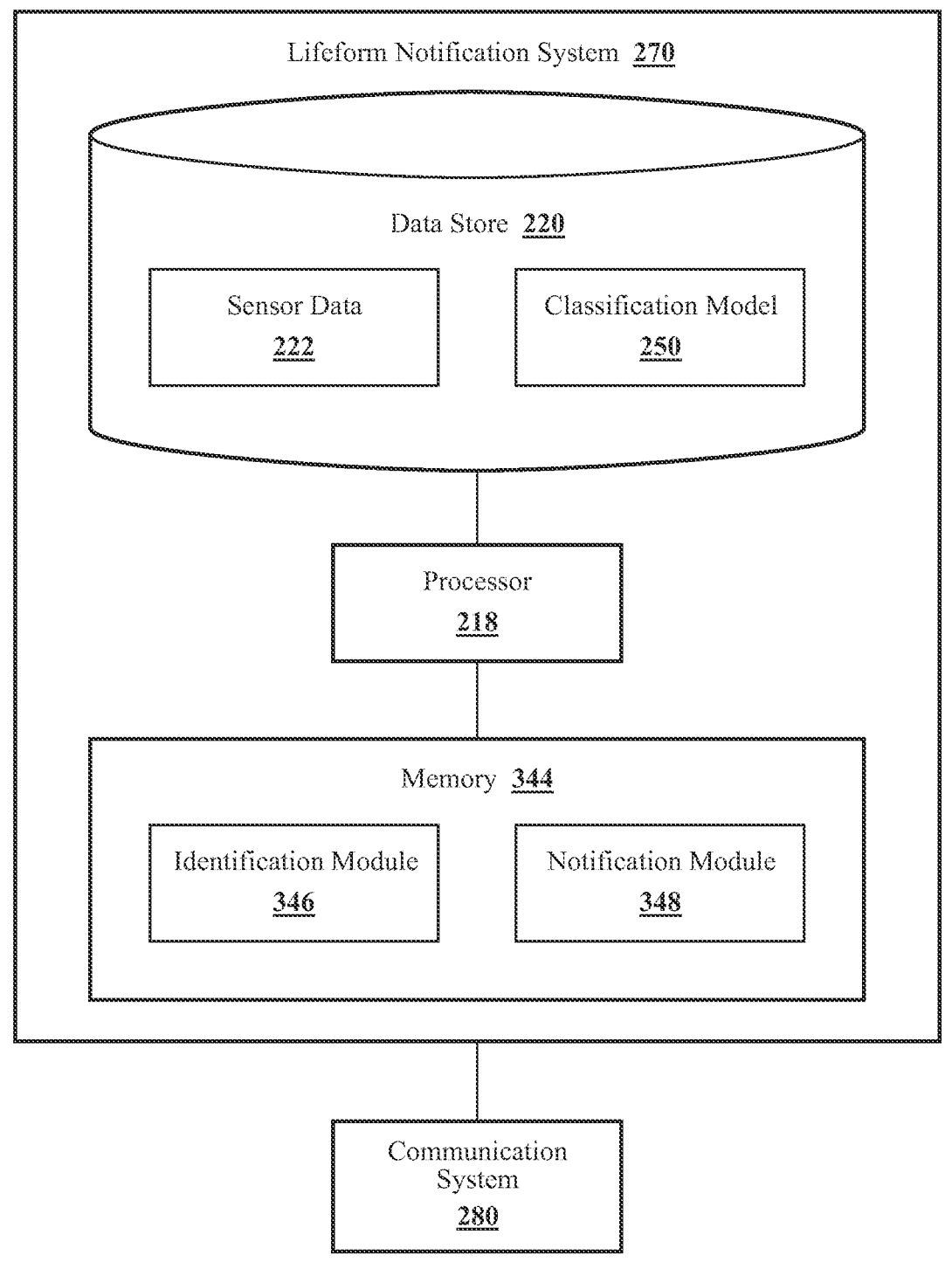
FIG. 3 illustrates one embodiment of a lifeform notification system that is associated with identifying lifeforms in the vicinity of a stationary vehicle.

With reference to FIG. 3, one embodiment of the lifeform notification system 270 of FIG. 2 is further illustrated. The lifeform notification system 270 is shown as including a processor 218 from the vehicle 100 of FIG. 2. Accordingly, the processor 218 may be a part of the lifeform notification system 270, the lifeform notification system 270 may include a separate processor from the processor 218 of the vehicle 100, or the lifeform notification system 270 may access the processor 218 through a data bus or another communication path that is separate from the vehicle 100. In one embodiment, the lifeform notification system 270 includes a memory 344 that stores an identification module 346 and a notification module 348. The memory 344 is a random-access memory (RAM), read-only memory (ROM), a hard-disk drive, a flash memory, or another suitable memory for storing the modules 346 and 348. The modules 346 and 348 are, for example, computer-readable instructions that when executed by the processor 218 cause the processor 218 to perform the various functions disclosed herein. In alternative arrangements, the modules 346 and 348 are independent elements from the memory 344 that are, for example, comprised of hardware elements. Thus, the modules 346 and 348 are alternatively application-specific integrated circuits (ASICs), hardware-based controllers, a composition of logic gates, or another hardware-based solution.

Moreover, in one embodiment, the lifeform notification system 270 includes the data store 220. The data store 220 is, in one embodiment, an electronic data structure stored in the memory 344 or another data storage device and that is configured with routines that can be executed by the processor 218 for analyzing stored data, providing stored data, organizing stored data, and so on. Thus, in one embodiment, the data store 220 stores data used by the modules 346 and 348 in executing various functions.

In general, the data store 220 stores the sensor data 222 that is relied on by the identification module 346 to 1) identify and track lifeforms in the vicinity of the vehicle 100 and 2) identify a last time the lifeforms in the vicinity of the vehicle 100 were detected. Specifically, the identification module 346 processes sensor data 222, such as camera images, to detect objects in the vicinity of the vehicle 100, identify any lifeforms in the vicinity of the vehicle 100, classify the lifeforms in the vicinity of the vehicle 100 (for example, as adults, children, or animals), detect the pose of the lifeforms, track the movement of the lifeforms, and in some cases estimate the location of the lifeforms, even when not in the field of view of the environment sensors 227 of the vehicle 100. As such, the sensor data 222 may include the camera images, LiDAR sensor output, radar sensor output, sonar sensor output, and/or any output collected from any of the number of environment sensors 227 found on the vehicle 100.

In one embodiment, the data store 220 stores the sensor data 222 along with, for example, metadata that characterizes various aspects of the sensor data 222. For example, as described above, it may be that a previously detected lifeform that is no longer in the field of view of the sensors, is still in the vicinity of the vehicle 100. In this example, the metadata may indicate the time/date stamps of when the separate sensor data 222 was generated, which time/date stamps indicate when the lifeform was detected. The identification module 346 and the notification module 348 may rely on this time/date stamp information when identifying lifeforms and generating notifications. For example, the notification module 348 may include the timestamp in the generated notification and may use the timestamp as a trigger for generating the notification.

As another example, the identification module 346 may rely on the timestamp metadata to estimate the location of the lifeform. In this example, the metadata may also include location coordinates (e.g., longitude and latitude) for the object. The identification module 346 may similarly rely on this location metadata to estimate the location of an out-of-frame lifeform. Additional details regarding the estimation of a lifeform location are provided below in connection with FIG. 6. While particular reference is made to particular metadata, other types of metadata may be included with its associated sensor data 222.

In one embodiment, the data store 220 further includes a classification model 250, which may be relied on by the identification module 346 to detect, identify, classify, and track the lifeforms in the vicinity of the vehicle 100. In an example, the lifeform notification system 270 may be a machine-learning system. In general, a machine-learning system identifies patterns based on previously unseen data. In the context of the present application, a machine-learning lifeform notification system 270 relies on some form of machine learning, whether supervised, unsupervised, reinforcement, or any other type, to identify lifeforms in environment sensor output, classify those lifeforms (for example, as adults, children, animals, transitory lifeforms and/or lingering lifeforms), and track/estimate the lifeform movement around the vehicle 100.

In an example, the classification model 250 is a supervised model where the system is trained with an input data set and optimized to meet a set of specific outputs. In another example, the classification model 250 is an unsupervised model where the model is trained with an input data set but not optimized to meet a set of specific outputs; instead, it is trained to classify based on common characteristics. As another example, the classification model 250 may be a self-trained reinforcement model based on trial and error. In any case, the classification model 250 includes the weights (including trainable and non-trainable), biases, variables, offset values, algorithms, parameters, and other elements that operate to output a likely identity, class, and movement of the detected lifeforms based on the sensor data 222. Examples of machine-learning models include, but are not limited to, logistic regression models, Support Vector Machine (SVM) models, naïve Bayes models, decision tree models, linear regression models, k-nearest neighbor models, random forest models, boosting algorithm models, and hierarchical clustering models. While particular models are described herein, the classification model 250 may be of various types intended to identify and classify lifeforms based on determined characteristics.

The lifeform notification system 270 further includes an identification module 346 that, in one embodiment, includes instructions that cause the processor 218 to 1) identify, from sensor data 222 collected from a sensor of a stationary vehicle 100, a lifeform in a vicinity of the stationary vehicle 100; 2) track a movement of the lifeform in the vicinity of the stationary vehicle 100; and 3) determine, from the sensor data 222, a last time the lifeform was in a field of view of the sensor. As described above, while the sensor system 225 of a vehicle 100 is able to apprise a vehicle operator of objects (e.g., lifeforms) in the vicinity of the vehicle 100, the ability of an associated warning system to prevent a potentially dangerous situation may be limited by 1) the field of view of the sensor system 225 and 2) the operational state of the vehicle 100. That is, lifeforms that are in the vicinity of the vehicle 100 but not currently in the field of view of the sensor system 225 (e.g., on account of being small and close to the vehicle 100 as depicted in FIGS. 1A and 1B) or that entered the vicinity of the vehicle 100 while the vehicle was turned off may not be detected by the vehicle sensor system 225 or observed by the vehicle operator. The lifeform notification system 270 and the identification module 346 operate to apprise the vehicle operator of these lifeforms (e.g., smaller lifeforms and those in the vicinity of the vehicle 100 while turned off) that may otherwise go unnoticed.

As such, the identification module 346 generally includes instructions that function to control the processor 218 to receive data inputs from one or more sensors of the vehicle 100. The inputs are, in one embodiment, observations of one or more objects in an environment proximate to the vehicle 100 and/or other aspects about the surroundings. As provided for herein, the identification module 346, in one embodiment, acquires sensor data 222 that includes at least camera images. In further arrangements, the identification module 346 acquires the sensor data 222 from further sensors such as a radar sensor 228, a LiDAR sensor 229, and other sensors as may be suitable for identifying vehicles and locations of the vehicles. Accordingly, the identification module 346, in one embodiment, controls the respective sensors to provide the data inputs in the form of the sensor data 222. Moreover, the identification module 346, in one embodiment, controls the sensors to acquire the sensor data 222 about an area that encompasses 360 degrees about the vehicle 100 in order to provide a comprehensive assessment of the surrounding environment.

As described above, the lifeform notification system 270 may operate in a sentry mode where the environment sensors 227 are battery operated and perceive the environment even when the vehicle 100 is in an off state. As such, the identification module 346 generally includes instructions that function to control the processor 218 to receive data inputs from battery-powered environment sensors 227. That is, the environment sensors 227 may receive power from a primary or supplemental vehicle battery and may operate even when the ignition is turned off.

In one approach, the identification module 346 implements and/or otherwise uses a machine learning algorithm. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on. In one configuration, the machine learning algorithm is embedded within the identification module 346 to perform lifeform identification and classification based on the sensor data 222. In one particular example, the machine-learning model may be a neural network that includes any number of 1) input nodes that receive sensor data 222, 2) hidden nodes, which may be arranged in layers connected to input nodes and/or other hidden nodes and which include computational instructions for computing outputs, and 3) output nodes connected to the hidden nodes which generate an output indicative of the existence, movement, and classification of a lifeform in the vicinity of the vehicle 100.

Of course, in further aspects, the identification module 346 may employ different machine learning algorithms or implement different approaches for performing lifeform identification and classification. Whichever particular approach the identification module 346 implements, the identification module 346 provides an output of an identification, classification, and/or estimated location of a lifeform in the vicinity of the vehicle 100. In any case, the output of the identification module 346 is transmitted to the notification module 348 to generate and present a notification of the detected lifeform. In this way, the lifeform notification system 270 may warn vehicle operators of undetected lifeforms in the vicinity of the vehicle 100. Additional details regarding the identification, classification, and location estimation of various lifeforms in the vicinity of vehicle 100 are provided below in connection with FIG. 4.

Moreover, it should be appreciated that machine learning algorithms are generally trained to perform a defined task. Thus, the training of the machine learning algorithm is understood to be distinct from the general use of the machine learning algorithm unless otherwise stated. That is, the lifeform notification system 270 or another system generally trains the machine learning algorithm according to a particular training approach, which may include supervised training, self-supervised training, reinforcement learning, and so on. In contrast to training/learning of the machine learning algorithm, the lifeform notification system 270 implements the machine learning algorithm to perform inference. Thus, the general use of the machine learning algorithm is described as inference.

It should be appreciated that the identification module 346, in combination with the classification model 250, can form a computational model such as a neural network model. In any case, the identification module 346, when implemented with a neural network model or another model in one embodiment, implements functional aspects of the classification model 250 while further aspects, such as learned weights, may be stored within the data store 220. Accordingly, the classification model 250 is generally integrated with the identification module 346 as a cohesive, functional structure.

The lifeform notification system 270 further includes a notification module 348 that, in one embodiment, includes instructions that cause the processor 218 to present a notification identifying 1) the lifeform and 2) the last time the lifeform was in the field of view of the sensor. As described above, the lifeform notification system 270 provides notifications that may otherwise not be generated. For example, an existing system may not provide notifications for lifeforms that have left the field of view of the sensor and may thus just provide real-time indication of detected lifeforms. However, such systems do not completely prevent dangerous circumstances as lifeforms that were previously detected, but currently outside of the field of view of the sensor system 225, may still be in a danger zone around the vehicle 100. Accordingly, the notification module 348 receives an output of the identification module 346 and generates a notification based on such, which notification may indicate the last time the lifeform was detected such that a vehicle operator may be apprised of the lifeform's presence and may take any necessary action to avoid a dangerous circumstance. The notification may take various forms, including a visual notification presented on a human-machine interface (HMI) of a vehicle 100. In another example, the notification may be sent to a user's personal device, such as a smartphone. In either case, the generated notification may be transmitted to the intended recipient via the communication system 280, which, as described above, may be a Wi-Fi, LGE, or other wireless-based network device. Additional details regarding the generation and presentation of the notification are provided below in connection with FIG. 4.

Figure 4:
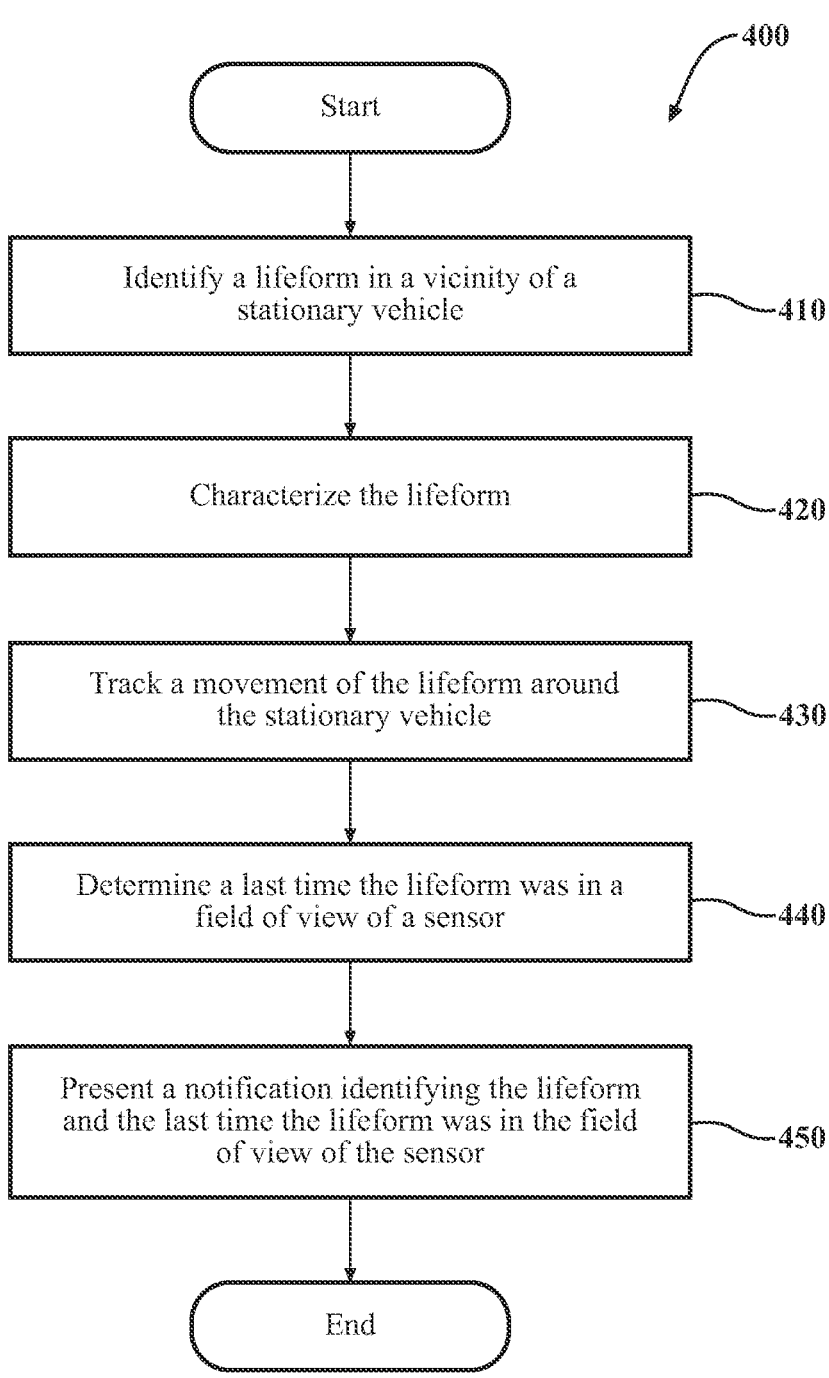
FIG. 4 illustrates a flowchart for one embodiment of a method that is associated with identifying lifeforms in the vicinity of a stationary vehicle.

Additional aspects of generating notifications of previously detected lifeforms in the vicinity of a vehicle 100 will be discussed in relation to FIG. 4. FIG. 4 illustrates a flowchart of a method 400 that is associated with presenting an indication of a detected lifeform, as well as an indication of the last time the lifeform was detected by one of the environment sensors 227 of the vehicle. Method 400 will be discussed from the perspective of the lifeform notification system 270 of FIGS. 2 and 3. While method 400 is discussed in combination with the lifeform notification system 270, it should be appreciated that the method 400 is not limited to being implemented within the lifeform notification system 270 but is instead one example of a system that may implement the method 400.

As described above, the method 400 described herein may be, at least partially, executed while the vehicle 100 is stationary. For example, a stationary vehicle 100 may be an idled vehicle, a vehicle that is unattended, and/or a vehicle that is in an off-state. In each case, a vehicle operator may or may not be in the vehicle 100. For example, the vehicle 100 may be sitting overnight in a private garage, or a driver may have left the vehicle 100 to grab a forgotten item from their home. In either of these examples, a small child or animal may be in the vicinity of the vehicle 100 but go unnoticed by the driver and/or undetected by the environment sensors 227 of the vehicle 100. In the case of a vehicle 100 in the off state, the environment sensors 227 of the vehicle 100 may enter a sentry mode wherein the sensors continue to collect data regarding the surroundings of the vehicle 100, notwithstanding other vehicle systems being inactive and the vehicle 100 ignition being in the off position. As such, in these examples, the lifeform notification system 270 continuously monitors for lifeforms in the vicinity of the vehicle 100, even when the vehicle 100 is turned off. In an example, the environment sensors 227 are coupled to the vehicle battery or power-source, but operated to be active even when other systems are inactive. In another example, the environment sensors 227 are powered by an independent power source. In one particular example, the environment sensors 227 may be motion-activated. That is, a detected movement may trigger the collection of sensor data 222. In any case, the present lifeform notification system 270 provides a comprehensive perception of the vehicle 100 surroundings, even when the vehicle is off, and notification of lifeforms detected therein.

At 410, the identification module 346 identifies, from sensor data 222 collected from a sensor of a stationary vehicle 100, a lifeform in the vicinity of the stationary vehicle 100. In general, identifying lifeforms in the vicinity includes analyzing the output of the environment sensors 227 to identify objects in the captured output (e.g., camera images). As such, the identification module 346 controls the sensor system 225 to acquire the sensor data 222. In one embodiment, the identification module 346 controls the radar sensor 228 and the camera 231 of the vehicle 100 to observe the surrounding environment. Alternatively, or additionally, the identification module 346 controls the camera 231 and the LiDAR sensor 229 or another set of sensors to acquire the sensor data 222.

In an example, identifying a lifeform in the vicinity of the stationary vehicle 100 includes differentiating lifeforms from other objects captured in the environment sensor 227 output. For example, other objects, such as falling leaves, debris, and precipitation, may also be detected by an image processor of the identification module 346. Were such other elements identified as a potential lifeform, a false positive notification may be generated. As such, the identification module 346 may differentiate between non-lifeforms and lifeforms. In one example, such a differentiation may be supported by a machine-learning operation. That is, lifeforms may have certain characteristics (such as size and/or movement patterns) that are distinct from non-lifeform characteristics. In this example, relying on the classification model 250, the identification module 346 may analyze the characteristics (e.g., size and/or movement patterns, among others) of a detected object to identify whether such is a lifeform or another non-lifeform object. In an example, the identification module 346 may rely on a machine-learning algorithm that has been trained on a data set. That is, during training, the identification module 346 may be presented with a number of images of objects (e.g., people, animals, dust, weather) and metadata characterizing those objects. The identification module 346 may be trained to identify patterns or characteristics in the training set images of objects that are particular to a specific object type. Accordingly, during object identification, the identification module 346 may, having been trained on this dataset, identify characteristics of objects in the images and characterize the objects in the images as lifeforms or non-lifeforms based on the identified characteristics.

Figure 5:
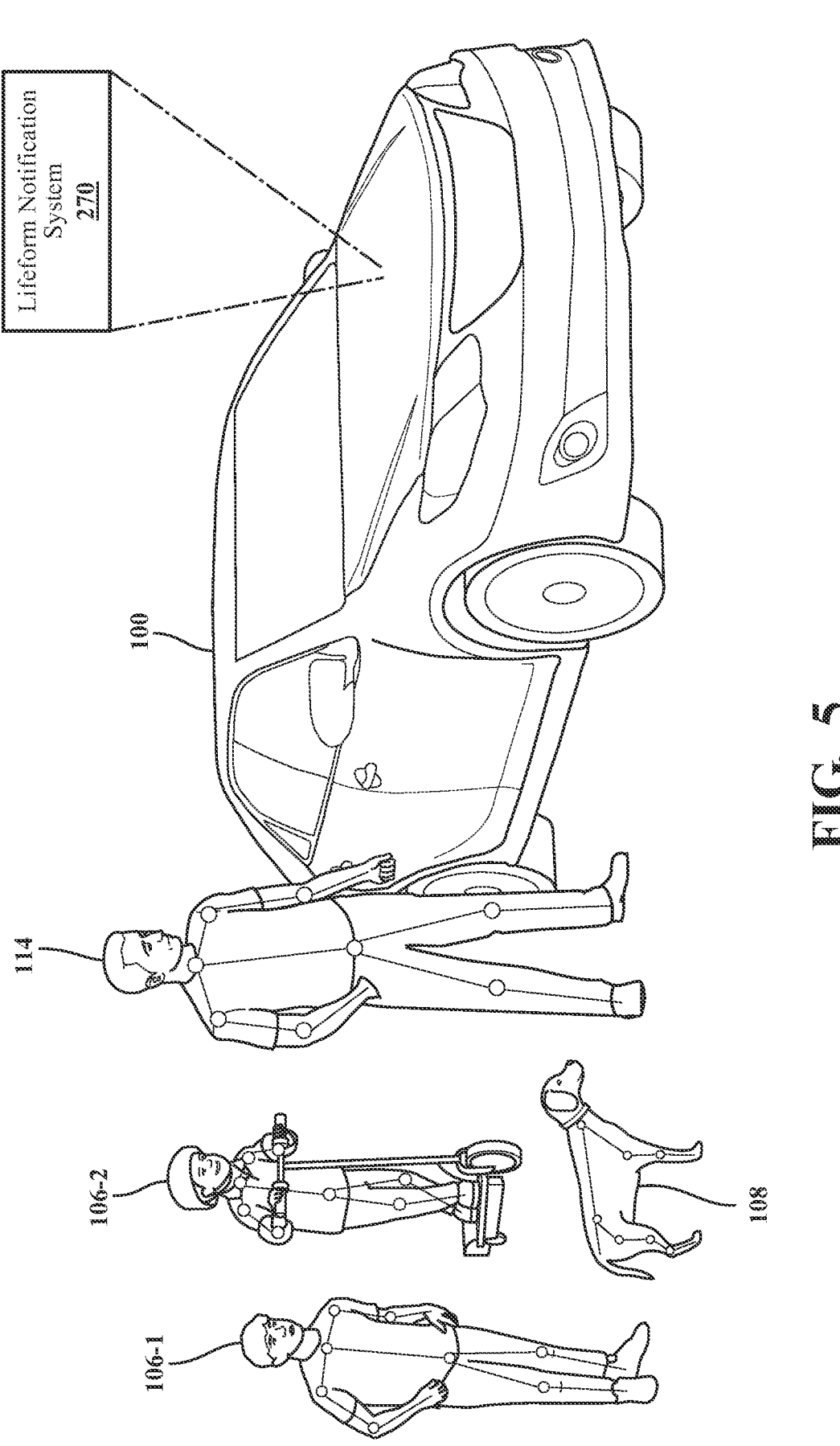
FIG. 5 illustrates one embodiment of a lifeform notification system differentiating between different types of lifeforms.

In an example, identifying a lifeform in the vicinity of the stationary vehicle 100 includes differentiating lifeforms that are transitory vs. those that are lingering/loitering in the vicinity of the vehicle 100. For example, as depicted in FIG. 5, the environment sensors 227 may detect lifeforms lingering around the vehicle 100 and those merely passing by the vehicle 100, such as a user of a motorized scooter. It may be desirable to generate a notification of a lingering lifeform as a lingering lifeform is more likely to still be around the vehicle, whereas it may be unnecessary to generate a safety alert regarding a transitory user as the transitory user is not likely to be in the vicinity of the vehicle 100 for an extended period.

Transitory lifeforms may exhibit different traits/characteristics from lingering lifeforms. For example, a transitory lifeform may be further away from the vehicle 100, may have a single movement pattern, may be traveling at a greater average speed compared to a lingering lifeform, and may be captured in fewer camera images than a lingering lifeform. By comparison, a lingering lifeform may generally be closer to the vehicle 100, have a staggered, random, or back-and-forth movement pattern, may be stationary and/or moving slower than a transitory lifeform, and may be detected in more frames of the sensor output than a transitory lifeform. As such, the identification module 346 may include an image processor to analyze the sensor output (e.g., camera images) and/or a sequence of sensor output to identify those patterns/traits that are characteristic of transitory lifeforms and those patterns/traits that are characteristic of a loitering or lingering lifeform. As with the differentiation between lifeform and non-lifeform objects, the differentiation between transitory and lingering lifeforms may be based on machine-learning algorithms, whether supervised or unsupervised, that analyze output frames to infer a type of lifeform (e.g., transitory or lingering).

In this example, the generation of a notification may be triggered by the identification of a lifeform (as opposed to a non-lifeform such as dust, debris, or other non-lifeform objects) lingering in the vicinity of the vehicle 100 (and therefore not transitory). By comparison, non-lifeforms and transitory lifeforms may not trigger the subsequent actions of the lifeform notification system 270 (e.g., classification, tracking, location estimation, and notification generation).

At 420, the identification module 346 characterizes the lifeform. That is, the identification module 346 includes instructions that, when executed by the processor 218, cause the processor 218 to classify the lifeform based on detected characteristics of the lifeform. As will be described below, the classification of the lifeform may govern the generation and presentation of a notification. For example, as described above, it may be assumed that an adult is more aware of their surroundings and the potential danger of being around an idled vehicle 100. Moreover, due to their larger dimensions, it is more likely that an adult will be perceived by a driver and the environment sensors 227. By comparison, an animal or child may 1) be unaware that the vehicle 100 has been turned on and a driver is about to back up and/or 2) be undetected by the driver and the environment sensors 227 as the vehicle 100 shifts into a reverse gear. As such, in these examples, the identification module 346 classifies the lifeform, specifically as at least one of a child or an animal, and generates a notification based on such. For example, a notification may be generated when a child or animal has been detected in the vicinity of the vehicle 100 within a threshold period. In contrast, a notification may not be generated when an adult has been detected in the vicinity of the vehicle 100.

As with the identification of a lifeform, the classification of a lifeform may be based on an analysis of the output of the environment sensors 227. For example, adults have different physical traits as compared to children, such as different heights, limb lengths, etc. Similarly, animals may have different physical traits as compared to humans. Accordingly, the identification module 346 may include an image processor that classifies the lifeform as an adult, a child, or an animal.

In an example, the identification module 346 may be presented with a number of images of lifeforms (e.g., adults, children, animals of various types) and metadata characterizing those lifeforms. The identification module 346 may be trained to identify patterns or characteristics in the training set images of lifeforms that are particular to a specific class of lifeform. As such, the identification module 346 may, having been trained on this dataset, identify characteristics of the lifeforms in the sensor output and classify the lifeforms based on the identified characteristics. Similarly, during training, the identification module 346 may rely on a machine-learning algorithm that has been trained on a data set to classify the lifeform. That is, during training, the identification module 346 may be presented with a number of images of humans (e.g., adults of various heights, ages, and builds, children of different ages, heights, and builds) and metadata characterizing those humans. The identification module 346 may be trained to identify patterns or characteristics of humans that are particular to a specific class of human. As such, the identification module 346 may, having been trained on this dataset, identify characteristics of the humans in the sensor output to classify the humans based on the identified characteristics.

In addition to classifying the lifeform based on type, the identification module 346 may also determine the pose of the classified lifeform. That is, the pose of the lifeform may be used to infer whether or not the lifeform is likely to remain in the vicinity of the vehicle. For example, a child sitting on the ground and hunched over may indicate that the child is playing with a toy and will likely remain in place for some time. By comparison, a child in a running pose may indicate that the child is near the vehicle but is not likely to remain so for long. Accordingly, the identification module 346 may include instructions that cause the processor 218 to analyze the image and detect a pose and a change in the pose over time of the classified lifeform. Pose detection may be executed for both human and non-human lifeforms.

At 430, the identification module 346 tracks the movement of the lifeform. That is, the identification module 346 may include instructions that cause the processor 218 to track a movement of the lifeform in the vicinity of the stationary vehicle 100. In some examples, the movement of the lifeform may be indicative of 1) whether the lifeform is still in the vicinity of the vehicle 100, even if outside of the field of view of the environment sensors 227 and 2) a location of the lifeform outside of the field of view of the environment sensors 227.

For example, the head of a child 106 may be periodically detected at a lower limit of the field of view of a backup camera 102 and then disappear from view. Thus, the tracked movement of the child's head into and out of the lower portion of the backup camera 102 field of view may indicate that the child 106, even if undetected by the backup camera 102, remains at the back of the vehicle 100.

Figure 6:
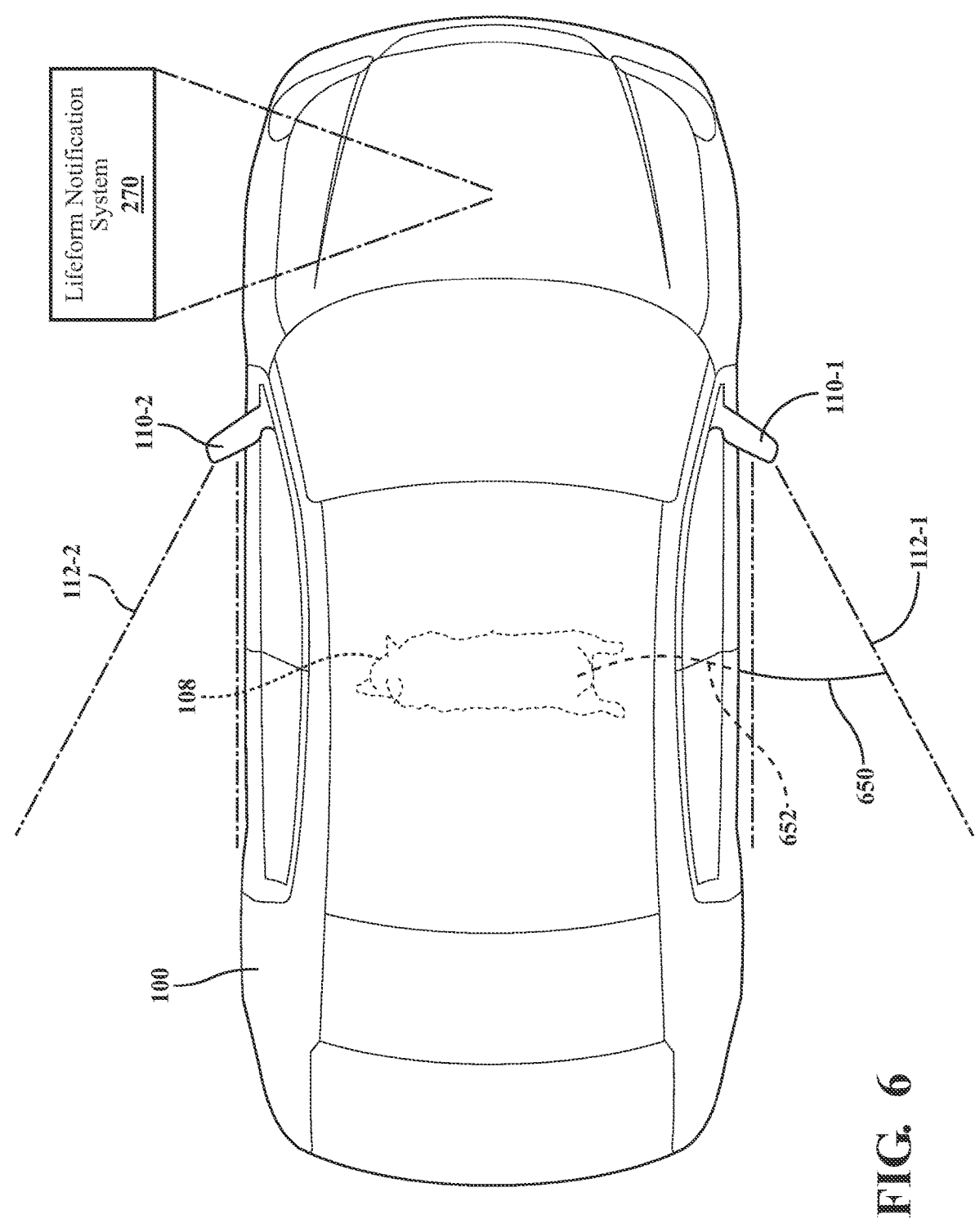
FIG. 6 illustrates one embodiment of a lifeform notification system estimating the location of a lifeform.

As another example, as depicted in FIG. 6, the identification module 346 may track the movement of an animal 108 across the field of view of a passenger side side-view camera 110 towards the vehicle 100. However, it may be that the animal 108 continues along the path outside the field of view of the side-view camera 110 (i.e., under the vehicle 100). In this example, the identification module 346 may track the movement of the lifeform through various frames of collected output to estimate the likely trajectory of the lifeform after the lifeform has left the field of view of the sensor. For example, the identification module 346 may compare the relative position of the lifeform in sequential frames of the output and extrapolate from those relative positions where the lifeform is likely to be found after the lifeform has left the field of view of the sensor.

In an example, the movement of the lifeform may be tracked across various sensors of the vehicle 100. For example, following the detection of the animal 108 moving towards the vehicle 100, as depicted in FIG. 6, a driver-side side-view camera 110 may detect the animal moving away from the vehicle 100 laterally. Relying on just the passenger side side-view camera 110, the identification module 346 may estimate that the animal 108 is under the vehicle 100. However, when aggregating the output of multiple vehicle sensors, the identification module 346 may estimate that the animal 108 has left the vicinity of the vehicle 100.

At 440, the identification module 346 determines the last time the lifeform was in the field of view of the sensor system 225 of the vehicle 100. That is, the identification module 346 may include instructions that cause the processor 218 to determine, from the sensor data 222, the last time the lifeform was in the field of view of the sensor. As described above, it may be that a lifeform that is out of the view of the vehicle 100 sensor system 225 when an operator enters the vehicle 100 was, at one point, in the field of view of the sensor. Accordingly, the identification module 346 analyzes the metadata associated with sensor data 222 to determine when the last time the lifeform was seen in the vicinity of the vehicle 100. This information may be included in the notification or the basis upon which a notification is generated. For example, the notification may be generated upon an operator engaging with the vehicle 100 (e.g., turning the vehicle 100 on, unlocking a vehicle door, opening a vehicle door, etc.). Upon such action, a notification may be presented to the driver via the HMI of the vehicle 100 or the driver's personal device, which notification indicates when the last time the target classification lifeform (e.g., the child or animal) was seen around the vehicle 100. The operator may then take any appropriate remedial measure. As another example, a notification may be presented if the last time the lifeform was seen is within some time horizon (e.g., 10 minutes, 20 minutes, 30 minutes, or 60 minutes, as examples) from when the driver engages with the vehicle 100. In either case, the driver may scan the vehicle 100 surroundings to identify whether the lifeform is still around and thus should be considered before operating the vehicle 100.

At 450, the notification module 348 presents a notification identifying the lifeform and the last time the lifeform was seen in the vicinity of the vehicle 100. That is, the notification module 348 includes instructions that cause the processor 218 to present a notification identifying the lifeform and the last time the lifeform was in the field of view of the sensor. The notification module 348 may generate a variety of different types of notifications. For example, the notification may be an audio notification, a visual notification, or a combination thereof.

In general, the notification indicates the last time a classified lifeform was seen. For example, as described above, the sensor data 222 may include metadata indicating a timestamp of the recorded sensor data 222. This metadata may be presented in the notification to apprise the user, such as a vehicle operator, of the last indication of the lifeform. The notification may include other information as well. For example, the notification may indicate where the lifeform was detected. The location may refer to the sensor/camera that detected the lifeform. For example, the notification may indicate "a child was last seen behind the vehicle at 12:30 pm." The notification may include other information, such as the detected classification (e.g., child, animal). In another example, the notification may include the image or other sensor output of the lifeform. Whatever is included in the notification, the notification may be presented on a variety of devices. In one example, the notification may be presented on a human-machine interface (HMI), such as an infotainment center of the vehicle. In another example, the notification may be presented on a user device, such as a smartphone, of the operator.

In an example, the generation of the notification may be triggered by any number of situations. For example, the notification may be responsive to operator engagement with the stationary vehicle 100. That is, as described above, the monitoring of the surroundings of the vehicle 100 may be continuous, even when the vehicle is unattended and/or in an off-state. The notification, however, may be presented when an operator engages with the vehicle 100. Examples of operator engagement include entering the vehicle 100 (i.e., unlocking and/or opening a vehicle door), turning the vehicle 100 on, and shifting the gear of the vehicle 100. As such, the notification module 348 may be in operative communication with other systems of the vehicle 100 that detect the engagement of the user with the vehicle 100. In another example, the notification may be triggered based on a detected movement of the operator towards the vehicle 100. In yet another example, the notification may be triggered based on the detection of an approaching operator based on near-field communication between the vehicle 100 and a user device.

In an example, the generation and presentation of the notification may be based on the classification of the lifeform. For example, it may be presumed that adults are more readily detectable by the sensor system 225, aware of the potential dangers of lingering around a stationary vehicle 100, and may exercise appropriate caution. Accordingly, a notification may not be generated when the detected lifeform is classified as an adult. By comparison, when the detected lifeform is an animal/child who does not appreciate the potential risk and/or may be unaware of how to respond to a pending vehicle movement, the notification module 348 may generate a notification.

In another example, the generation and presentation of the notification may be based on the timestamp of the last detection of the lifeform and the time the operator engages with the vehicle 100. For example, the notification module 348 may generate notifications for lifeforms detected within some threshold range (e.g., 20 minutes, 10 minutes, 5 minutes) from when the operator engaged with the vehicle 100. Detected lifeforms last seen outside this time range may not necessarily trigger a notification generation. Examples of generated notifications are presented below in connection with FIGS. 7A and 7B.

In addition to generating a notification, in some examples the lifeform notification system 270 may take additional remedial actions, such as deactivating some of the vehicle systems, such as a throttle system 238 and a transmission system 239, thus preventing movement of the vehicle 100 until the situation has been resolved (e.g., the operator has inspected the vehicle surroundings and confirmed such through an HMI).

As described above, the method 400, or at least portions of the method 400, may be performed while the stationary vehicle is in an off state. That is, the identification module 346 identifies the lifeform in the vicinity of the stationary vehicle 100, tracks the movement of the lifeform, and determines the last time the lifeform was in the field of view of the sensor while the stationary vehicle 100 is in an off state. As such, the identification module 346 may operate in a sentry mode where the environment sensors 227 are active and continuously monitoring for potential out-of-frame lingering lifeforms regardless of the state of other systems of the vehicle 100. Thus, the present method 400 promotes user safety by generating notifications for lifeforms that may be in the vicinity of a vehicle, even if not in the field of view of the sensors of the vehicle and while the vehicle is in an off state.

FIG. 5 illustrates one embodiment of a lifeform notification system 270 differentiating between different lifeforms. As described above, different lifeforms have different physical traits/characteristics. For example, as depicted in FIG. 5, an adult 114 may be taller and have different physical characteristics than a child 106. Similarly, animals 108 have different physical characteristics that may be detected by the identification module 346 and used to classify the lifeform. As one example, the identification module 346 may analyze the physical traits of the lifeforms, for example, as wireframes, to identify those characteristics that define the lifeform as a child 106-1 and 106-2, an animal 108, or an adult 114. In a similar fashion, the identification module 346 may be able to differentiate lifeforms from non-lifeforms as described above, based on, for example, the size, location, and movement pattern of a detected object. As such, the identification module 346 includes instructions that cause the processor to differentiate between lifeforms and other elements detected by the sensor.

As described above, lingering lifeforms may trigger the generation of a notification, while a transitory lifeform may not trigger the generation of a notification. As such, the identification module 346 includes instructions that cause the processor to infer from the sensor data 222 that the lifeform is a lingering lifeform when outside of the field of view of the sensor. As described above, a lingering lifeform may have different physical traits/behaviors and different movement traits/behaviors than a transitory lifeform. For example, a child 106-2 on a scooter may have a straighter trajectory, travel at a higher speed, and be in fewer frames of the sensor output than a lingering child 106-1. The identification module 346, which may rely on machine-learning, may identify those characteristics indicative of either a lingering lifeform or a transitory lifeform and classify the lifeform as such. In an example, the state of a lifeform as lingering or transitory may be made even when the lifeform is no longer in the frame of a sensor of the vehicle 100. For example, a lingering child 106-1 may be detected in multiple frames of a side-view camera 110 and disappear out the bottom of the field of view only to re-appear a few frames later. Based on this information, the identification module 346 may infer that the lingering child 106-1 is sitting near the vehicle, albeit out of the field of view of the side-view camera 110. In either case, the notification module 348 may cause the processor to present the notification based on the lifeform lingering in the vicinity of the stationary vehicle 100.

FIG. 6 illustrates one embodiment of a lifeform notification system 270 estimating the location of a lifeform. As described above, in some examples, a lifeform, such as an animal 108, may leave the field of view of the camera but still be in the vicinity of the vehicle 100 and, thus, potentially in a dangerous position. As such, the lifeform notification system 270 may infer or estimate the location of the lifeform that is outside of the field of view of a vehicle sensor but still in the vicinity of the vehicle 100. That is, the identification module 346 may cause the processor 218 to estimate the location of the lifeform when not in the field of view of the sensor based on the tracked movement of the lifeform. For example, the identification module 346 may identify a detected path 650 of the animal 108 while in the field of view 112-1 of a passenger side side-view camera 110-1. The detected path 650 of the animal 108 may be towards the vehicle 100, as depicted in FIG. 6. However, the animal 108 may move outside the field of view 112-1 of the passenger side side-view camera 110-1, under the vehicle 100 in the example depicted in FIG. 6. In this example, the identification module 346 may extrapolate from the sensor data 222 an estimated path 652 of the animal 108. In an example, the estimated location may be based on the combination of sensor data 222, or the lack thereof, from multiple vehicle sensors. For example, given that the animal 108 is not detected within the field of view 112-2 of the driver side side-view camera 110-2, it may be inferred that the animal 108 is located under the vehicle 100, and an appropriate notification may be generated.

As such, the identification module 346 identifies lifeform behaviors that indicate that the lifeform is still in the vicinity of the vehicle 100, even when out of the field of view of the environment sensors 227 of the vehicle 100. This may be done by relying on a machine-learning analysis of the number of frames captured by the lifeform, movement patterns, pose, location, etc. of the lifeform. In an example, the notification module 348 may present a notification that identifies the estimated location of the lifeform. In an example, the generation of the notification may be based on the estimated location of the lifeform. For example, were the lifeform to have continued its path from the underside of the vehicle 100 away from the vehicle 100 as depicted by the driver side side-view camera 110-2, no notification may be generated.

Figure 7A:
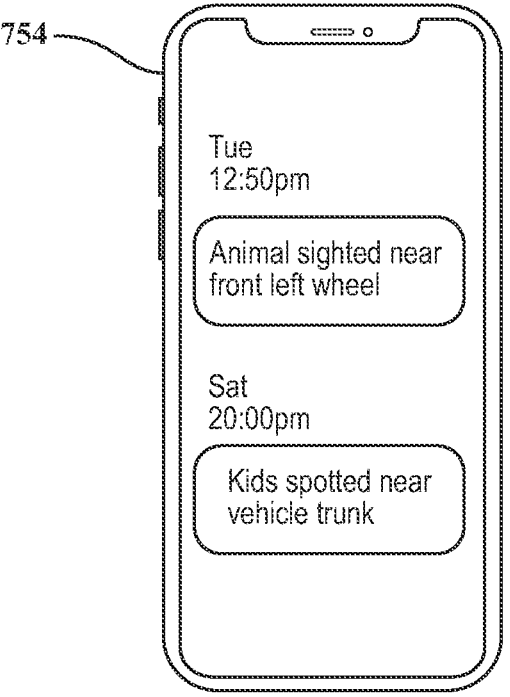
FIGS. 7A and 7B illustrate examples of notifications generated by the lifeform notification system.
Figure 7B:
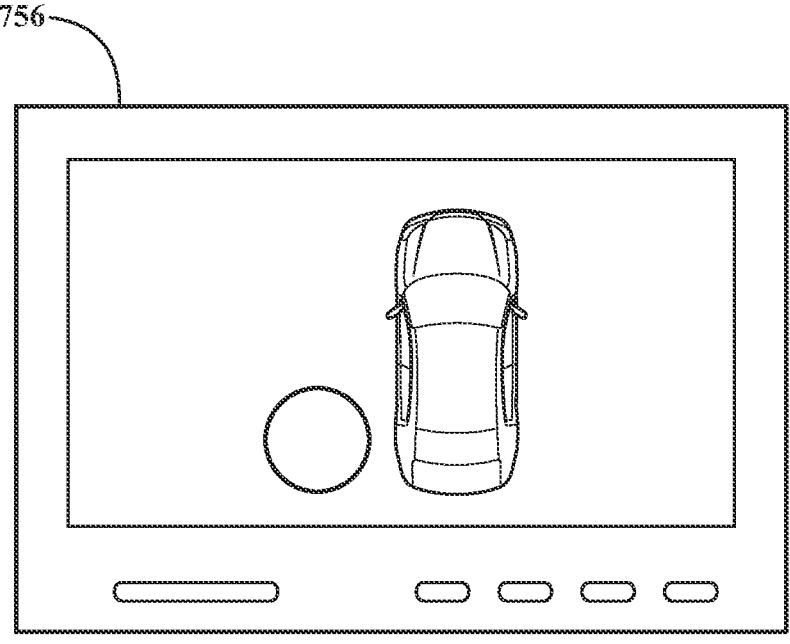

FIGS. 7A and 7B illustrate examples of notifications generated by the lifeform notification system 270. As described above, the notification may be presented on a variety of devices, including a user device 754, such as a smartphone, as depicted in FIG. 7A or an HMI 756, for example, a vehicle infotainment system as depicted in FIG. 7B. The content of the notification may also be varied. For example, as depicted in FIG. 7A, the notification may include a textual indication of the last location of the lifeform as well as a timestamp when the lifeform was last seen. In an example, a log of notifications may be presented. In the example depicted in FIG. 7A, a log of multiple notifications spanning multiple days is presented. This log may be manually or automatically cleared. In another example, notifications may be generated and presented when they occur within some predetermined window, for example, a predetermined period before the operator engages with the vehicle 100.

As depicted in the example of FIG. 7B, the notification may include sensor data output indicating the last location of a detected lifeform. For example, the notification may include a graphic of the vehicle 100 and an indication of a general location (e.g., a zone around the vehicle) where the lifeform was detected. In another example, the notification may include the output (e.g., image) of the detected lifeform. While particular reference is made to particular forms and types of notification, other types of notification or other content may be presented in the notification.

Figure 8:
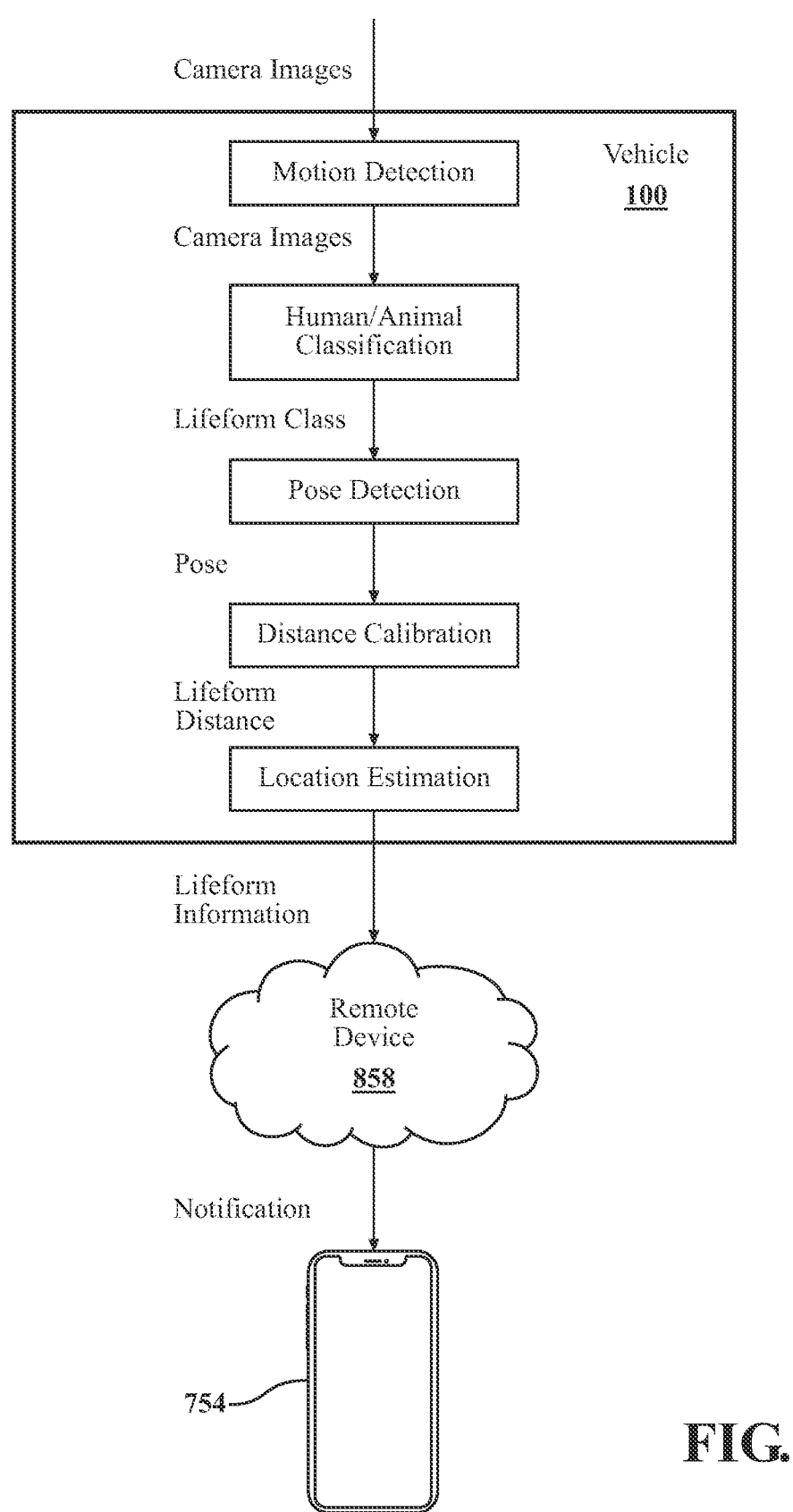
FIG. 8 illustrates one embodiment of an operation to generate a notification for an identified lifeform in the vicinity of a stationary vehicle.

FIG. 8 illustrates one embodiment of an operation to generate a notification for an identified lifeform in the vicinity of a stationary vehicle 100. As described above, the monitoring of lifeforms around the vicinity of the vehicle 100 may occur continuously, for example, via a lifeform notification system 270 and environment sensors 227 that are battery-powered and active even when other systems of the vehicle 100 may not be. Generation of the notification by comparison, may be triggered when the vehicle 100 is active, for example when the ignition is turned on. In this example, when the ignition is turned on, the vehicle 100 may communicate the object location and associated metadata to a remote device 858 for transmitting, and in some cases, generating a notification.

For example, when the vehicle is in an off state, the identification module 346 may receive camera images and perform motion detection to identify a lifeform in the vicinity of the vehicle 100. As described above, this may include 1) differentiation between a lifeform and a non-lifeform in the vicinity of the vehicle and 2) differentiation between a transitory lifeform and a lingering lifeform. The identification module 346 may also classify the lifeform (e.g., as either a human or an animal) and perform pose detection from which an inferred/estimated position/movement of the lifeform is made. The identification module 346 also determines the distance of the lifeform from the vehicle 100 and, in some cases, estimates the location of the lifeform. Once the vehicle 100 is turned on and connected to a remote device 858 via the communication system 280, the lifeform location, and in some examples the generated presentation, is passed to the remote device 858. The remote device 858 then wirelessly transmits the generated notification to a device such as a user device 754. In another example, the remote device 858 generates the notification and wirelessly transmits it to the user device 754 or another device.

FIG. 2 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 2, the vehicle 100 includes one or more processors 218. In one or more arrangements, the processor(s) 218 can be a primary/centralized processor of the vehicle 100 or may be representative of many distributed processing units. For instance, the processor(s) 218 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 220 for storing one or more types of data. The data store 220 can be comprised of volatile and/or non-volatile memory. Examples of memory that may form the data store 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 220 is a component of the processor(s) 218. In general, the data store 220 is operatively connected to the processor(s) 218 for use thereby. The term "operatively connected," as used throughout this description, can include direct or indirect connections, including connections without direct physical contact.

In one or more arrangements, the one or more data stores 220 include various data elements to support functions of the vehicle 100, such as semi-autonomous and/or autonomous functions. Thus, the data store 220 may store map data 221 and/or sensor data 222. The map data 221 includes, in at least one approach, maps of one or more geographic areas. In some instances, the map data 221 can include information about roads (e.g., lane and/or road maps), traffic control devices, road markings, structures, features, and/or landmarks in the one or more geographic areas. The map data 221 may be characterized, in at least one approach, as a high-definition (HD) map that provides information for autonomous and/or semi-autonomous functions.

In one or more arrangements, the map data 221 can include one or more terrain maps 223. The terrain map(s) 223 can include information about the ground, terrain, roads, surfaces, and/or other features of one or more geographic areas. The terrain map(s) 223 can include elevation data in the one or more geographic areas. In one or more arrangements, the map data 221 includes one or more static obstacle maps 224. The static obstacle map(s) 224 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 222 is data provided from one or more sensors of the sensor system 225. Thus, the sensor data 222 may include observations of a surrounding environment of the vehicle 100 and/or information about the vehicle 100 itself. In some instances, one or more data stores 220 located onboard the vehicle 100 store at least a portion of the map data 221 and/or the sensor data 222. Alternatively, or in addition, at least a portion of the map data 221 and/or the sensor data 222 can be located in one or more data stores 220 that are located remotely from the vehicle 100.

As noted above, the vehicle 100 can include the sensor system 225. The sensor system 225 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 225 and/or the one or more sensors can be operatively connected to the processor(s) 218, the data store(s) 220, and/or another element of the vehicle 100.

Various examples of different types of sensors will be described herein. However, it will be understood that the embodiments are not limited to the particular sensors described. In various configurations, the sensor system 225 includes one or more vehicle sensors 226 and/or one or more environment sensors. The vehicle sensor(s) 226 function to sense information about the vehicle 100 itself. In one or more arrangements, the vehicle sensor(s) 226 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 225 can include one or more environment sensors 227 that sense a surrounding environment (e.g., external) of the vehicle 100 and/or, in at least one arrangement, an environment of a passenger cabin of the vehicle 100. For example, the one or more environment sensors 227 sense objects the surrounding environment of the vehicle 100. Such obstacles may be stationary objects and/or dynamic objects. Various examples of sensors of the sensor system 225 will be described herein. The example sensors may be part of the one or more environment sensors 227 and/or the one or more vehicle sensors 226. However, it will be understood that the embodiments are not limited to the particular sensors described. As an example, in one or more arrangements, the sensor system 225 includes one or more radar sensors 228, one or more LIDAR sensors 229, one or more sonar sensors 230 (e.g., ultrasonic sensors), and/or one or more cameras 231 (e.g., monocular, stereoscopic, RGB, infrared, etc.).

Continuing with the discussion of elements from FIG. 2, the vehicle 100 can include an input system 232. The input system 232 generally encompasses one or more devices that enable the acquisition of information by a machine from an outside source, such as an operator. The input system 232 can receive an input from a vehicle passenger (e.g., a driver/operator and/or a passenger). Additionally, in at least one configuration, the vehicle 100 includes an output system 233. The output system 233 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 234. Various examples of the one or more vehicle systems 234 are shown in FIG. 2. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 235, a braking system 236, a steering system 237, a throttle system 238, a transmission system 239, a signaling system 240, and a navigation system 241.

The navigation system 241 can include one or more devices, applications, and/or combinations thereof to determine the geographic location of the vehicle 100 and/or to determine a travel route for the vehicle 100. The navigation system 241 can include one or more mapping applications to determine a travel route for the vehicle 100 according to, for example, the map data 221. The navigation system 241 may include or at least provide connection to a global positioning system, a local positioning system or a geolocation system.

In one or more configurations, the vehicle systems 234 function cooperatively with other components of the vehicle 100. For example, the processor(s) 218, the lifeform notification system 270, and/or automated driving module(s) 243 can be operatively connected to communicate with the various vehicle systems 234 and/or individual components thereof. For example, the processor(s) 218 and/or the automated driving module(s) 243 can be in communication to send and/or receive information from the various vehicle systems 234 to control the navigation and/or maneuvering of the vehicle 100. The processor(s) 218, the lifeform notification system 270, and/or the automated driving module(s) 243 may control some or all of these vehicle systems 234.

For example, when operating in the autonomous mode, the processor(s) 218 and/or the automated driving module(s) 243 control the heading and speed of the vehicle 100. The processor(s) 218 and/or the automated driving module(s) 243 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 242 in at least one configuration. The actuators 242 are, for example, elements operable to move and/or control a mechanism, such as one or more of the vehicle systems 234 or components thereof responsive to electronic signals or other inputs from the processor(s) 218 and/or the automated driving module(s) 243. The one or more actuators 242 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 218, implement one or more of the various functions described herein. In various arrangements, one or more of the modules are a component of the processor(s) 218, or one or more of the modules are executed on and/or distributed among other processing systems to which the processor(s) 218 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 243. The automated driving module(s) 243, in at least one approach, receive data from the sensor system 225 and/or other systems associated with the vehicle 100. In one or more arrangements, the automated driving module(s) 243 use such data to perceive a surrounding environment of the vehicle. The automated driving module(s) 243 determine a position of the vehicle 100 in the surrounding environment and map aspects of the surrounding environment. For example, the automated driving module(s) 243 determines the location of obstacles or other environmental features including traffic signs, trees, shrubs, neighboring vehicles, pedestrians, etc.

The automated driving module(s) 243 either independently or in combination with the lifeform notification system 270 can be configured to determine travel path(s), current autonomous driving maneuvers for the vehicle 100, future autonomous driving maneuvers and/or modifications to current autonomous driving maneuvers based on data acquired by the sensor system 225 and/or another source. In general, the automated driving module(s) 243 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
evaluate sensor data of a stationary vehicle with a neural network to identify a lifeform in a vicinity of the stationary vehicle and determine a body pose of the lifeform;
analyze the body pose to determine an inferred behavior of the lifeform;
track a movement of the lifeform in the vicinity of the stationary vehicle based in part on the inferred behavior;
determine, from the sensor data, a last time the lifeform was in a field of view of the sensor; and
responsive to activation of a vehicle system required for movement, present a notification via the vehicle identifying the lifeform and the last time the lifeform was in the field of view of the sensor and the inferred behavior.

2. The system of claim 1, wherein the vehicle system is the vehicle ignition system.

3. The system of claim 1, wherein the machine-readable instructions that, when executed by the processor, cause the processor to identify the lifeform in the vicinity of the stationary vehicle, track the movement of the lifeform, and determine the last time the lifeform was in the field of view of the sensor are executed while the stationary vehicle is in an off state.

4. The system of claim 1, wherein the machine-readable instruction that, when executed by the processor, causes the processor to identify the lifeform in the vicinity of the stationary vehicle comprises machine-readable instructions that, when executed by the processor, cause the processor to:

differentiate between lifeforms and other elements detected by the sensor; and characterize the lifeforms as at least one of transitory lifeforms or lingering lifeforms.

5. The system of claim 4, wherein:

the machine-readable instruction that, when executed by the processor, causes the processor to characterize the lifeforms comprises a machine-readable instruction that, when executed by the processor, causes the processor to infer from machine learning applied to the sensor data that the lifeform, when outside of the field of view of the sensor, is a lingering lifeform; and the machine-readable instruction that, when executed by the processor, causes the processor to present the notification comprises a machine-readable instruction that, when executed by the processor, causes the processor to present the notification based on the lifeform lingering in the vicinity of the stationary vehicle.

6. The system of claim 1, wherein:

the machine-readable instructions further comprise a machine-readable instruction that, when executed by the processor, causes the processor to classify the lifeform based on detected characteristics of the lifeform; and the machine-readable instruction that, when executed by the processor, causes the processor to present the notification comprises a machine-readable instruction that, when executed by the processor, causes the processor to indicate a class of the lifeform.

7. The system of claim 6, wherein the machine-readable instruction that, when executed by the processor, causes the processor to classify the lifeform comprises a machine-readable instruction that, when executed by the processor, causes the processor to classify the lifeform as at least one of a child or an animal.

8. The system of claim 1, wherein:

the machine-readable instructions further comprise a machine-readable instruction that, when executed by the processor, causes the processor to estimate a location of the lifeform when not in the field of view of the sensor based on tracked movement of the lifeform; and the machine-readable instruction that, when executed by the processor, causes the processor to present the notification comprises a machine-readable instruction that, when executed by the processor, causes the processor to identify an estimated location of the lifeform.

9. The system of claim 1, wherein the machine-readable instruction that, when executed by the processor, causes the processor to present the notification comprises a machine-readable instruction that, when executed by the processor, causes the processor to present at least one of a textual indication or sensor data output indicating of a last location of the lifeform.

10. A non-transitory machine-readable medium comprising instructions that, when executed by a processor, cause the processor to:

evaluate sensor data of a stationary vehicle with a neural network to identify a lifeform in a vicinity of the stationary vehicle and determine a body pose of the lifeform;

analyze the body pose to determine an inferred behavior of the lifeform;

track a movement of the lifeform in the vicinity of the stationary vehicle based in part on the inferred behavior;

determine, from the sensor data, a last time the lifeform was in a field of view of the sensor; and responsive to activation of a vehicle system required for movement, present a notification via the vehicle identifying the lifeform and the last time the lifeform was in the field of view of the sensor and the inferred behavior.

11. The non-transitory machine-readable medium of claim 10, wherein the vehicle system is the vehicle ignition system.

12. The non-transitory machine-readable medium of claim 10, wherein the instructions that, when executed by the processor, cause the processor to identify the lifeform in the vicinity of the stationary vehicle, track the movement of the lifeform, and determine the last time the lifeform was in the field of view of the sensor are executed while the stationary vehicle is in an off state.

13. The non-transitory machine-readable medium of claim 10, wherein the instruction that, when executed by the processor, causes the processor to identify the lifeform in the vicinity of the stationary vehicle comprises instructions that, when executed by the processor, cause the processor to:

differentiate between lifeforms and other elements detected by the sensor; and characterize the lifeforms as at least one of transitory lifeforms or lingering lifeforms.

14. The non-transitory machine-readable medium of claim 10, wherein:

the machine-readable medium further comprises an instruction that, when executed by the processor, causes the processor to classify the lifeform based on detected characteristics of the lifeform; and the instruction that, when executed by the processor, causes the processor to present the notification comprises an instruction that, when executed by the processor, causes the processor to indicate a class of the lifeform.

15. The non-transitory machine-readable medium of claim 10, wherein:

the machine-readable medium further comprises an instruction that, when executed by the processor, causes the processor to estimate a location of the lifeform when not in the field of view of the sensor based on tracked movement of the lifeform; and the instruction that, when executed by the processor, causes the processor to present the notification comprises an instruction that, when executed by the processor, causes the processor to identify an estimated location of the lifeform.

16. A method, comprising:

evaluating sensor data of a stationary vehicle with a neural network to identify a lifeform in a vicinity of the stationary vehicle and determining a body pose of the lifeform;

analyzing the body pose to determine an inferred behavior of the lifeform;

tracking a movement of the lifeform in the vicinity of the stationary vehicle based in part on the inferred behavior;

determining, from the sensor data, a last time the lifeform was in a field of view of the sensor; and responsive to activation of a vehicle system required for movement, presenting a notification via the vehicle identifying the lifeform and the last time the lifeform was in the field of view of the sensor and the inferred behavior.

17. The method of claim 16, wherein the vehicle system is the vehicle ignition system.

18. The method of claim 16, wherein identifying the lifeform in the vicinity of the stationary vehicle comprises:

differentiating between lifeforms and other elements detected by the sensor; and characterizing the lifeforms as at least one of transitory lifeforms or lingering lifeforms.

19. The method of claim 16:

further comprising classifying the lifeform based on detected characteristics of the lifeform; and wherein presenting the notification comprises indicating a class of the lifeform.

20. The method of claim 16:

further comprising estimating a location of the lifeform when not in the field of view of the sensor based on tracked movement of the lifeform; and presenting the notification comprises identifying an estimated location of the lifeform.

\* \* \* \* \*